US008234676B2

(12) United States Patent
Klein et al.

(10) Patent No.: US 8,234,676 B2
(45) Date of Patent: Jul. 31, 2012

(54) SYSTEM AND METHOD OF DELIVERING EVENT NOTIFICATIONS

(75) Inventors: Adam Klein, Cedar Park, TX (US); James Austin Britt, Manor, TX (US); Joshua J. Fox, Austin, TX (US); Tara Hines, McKinney, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 711 days.

(21) Appl. No.: 12/054,929

(22) Filed: Mar. 25, 2008

(65) Prior Publication Data
US 2009/0249391 A1 Oct. 1, 2009

(51) Int. Cl.
G06F 3/00 (2006.01)
G06F 13/00 (2006.01)
H04N 5/445 (2011.01)

(52) U.S. Cl. ........... 725/58; 725/10; 725/32; 725/62; 725/106; 725/133; 725/153; 379/201.1; 455/412.2

(58) Field of Classification Search .................. None
See application file for complete search history.

(56) References Cited

U.S. PATENT DOCUMENTS

| 5,875,302 | A  | * | 2/1999  | Obhan ............... 709/225 |
| 6,799,017 | B1 | * | 9/2004  | Kregel ............... 455/70 |
| 7,120,238 | B1 | * | 10/2006 | Bednarz et al. ........ 379/201.1 |
| 2002/0026496 | A1 | * | 2/2002  | Boyer et al. ........... 709/218 |
| 2002/0162116 | A1 | * | 10/2002 | Read et al. ............ 725/106 |
| 2003/0078966 | A1 | * | 4/2003  | Kinjo ................ 709/203 |
| 2005/0034147 | A1 | * | 2/2005  | Best et al. ............. 725/10 |
| 2005/0091680 | A1 | * | 4/2005  | Kondo ................ 725/12 |
| 2005/0108769 | A1 | * | 5/2005  | Arnold et al. .......... 725/115 |
| 2005/0152525 | A1 | * | 7/2005  | Kent et al. ........... 379/207.02 |
| 2006/0167761 | A1 | * | 7/2006  | Elcock et al. ........... 705/26 |
| 2006/0224988 | A1 | * | 10/2006 | Bedingfield ............ 715/774 |
| 2007/0124424 | A1 |   | 5/2007  | Matsuda |
| 2007/0169142 | A1 | * | 7/2007  | Claassen et al. ......... 725/10 |
| 2007/0217585 | A1 |   | 9/2007  | Wollmershauser et al. |
| 2007/0239559 | A1 |   | 10/2007 | Alperin et al. |
| 2007/0244969 | A1 |   | 10/2007 | Knight et al. |
| 2009/0049466 | A1 | * | 2/2009  | Schoettle et al. ......... 725/14 |
| 2009/0100347 | A1 | * | 4/2009  | Schemers et al. ........ 715/751 |

* cited by examiner

*Primary Examiner* — Dominic D Saltarelli
*Assistant Examiner* — Jason J Chung
(74) *Attorney, Agent, or Firm* — Guntin Meles & Gust, PLC; Ed Guntin

(57) ABSTRACT

A method of delivering event notifications includes receiving data from a network-based calendar system at a notification system. The data indicates that a notification related to a calendar-based event is to be sent to a subscriber. The method also includes receiving presence information related to the subscriber from a presence system. The presence information indicates whether the subscriber is present at one or more of a plurality of subscriber devices. The plurality of subscriber devices includes a set-top box device. Further, the method includes sending an event notification related to the calendar-based event to the set-top box device when the presence information indicates that the subscriber is present at the set-top box device.

21 Claims, 6 Drawing Sheets

SYSTEM AND METHOD OF DELIVERING EVENT NOTIFICATIONS

FIELD OF THE DISCLOSURE

The present disclosure generally relates to delivering event notifications.

BACKGROUND

Users can keep track of appointments and other events via calendar systems. Timely reminders from such systems can help users avoid missing such events. Nonetheless, when reminders are sent to multiple devices, users can spend time managing redundant or expired reminders.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed systems, methods or computer-readable media. Moreover, some statements may apply to some inventive features but not to others.

Figure 1:
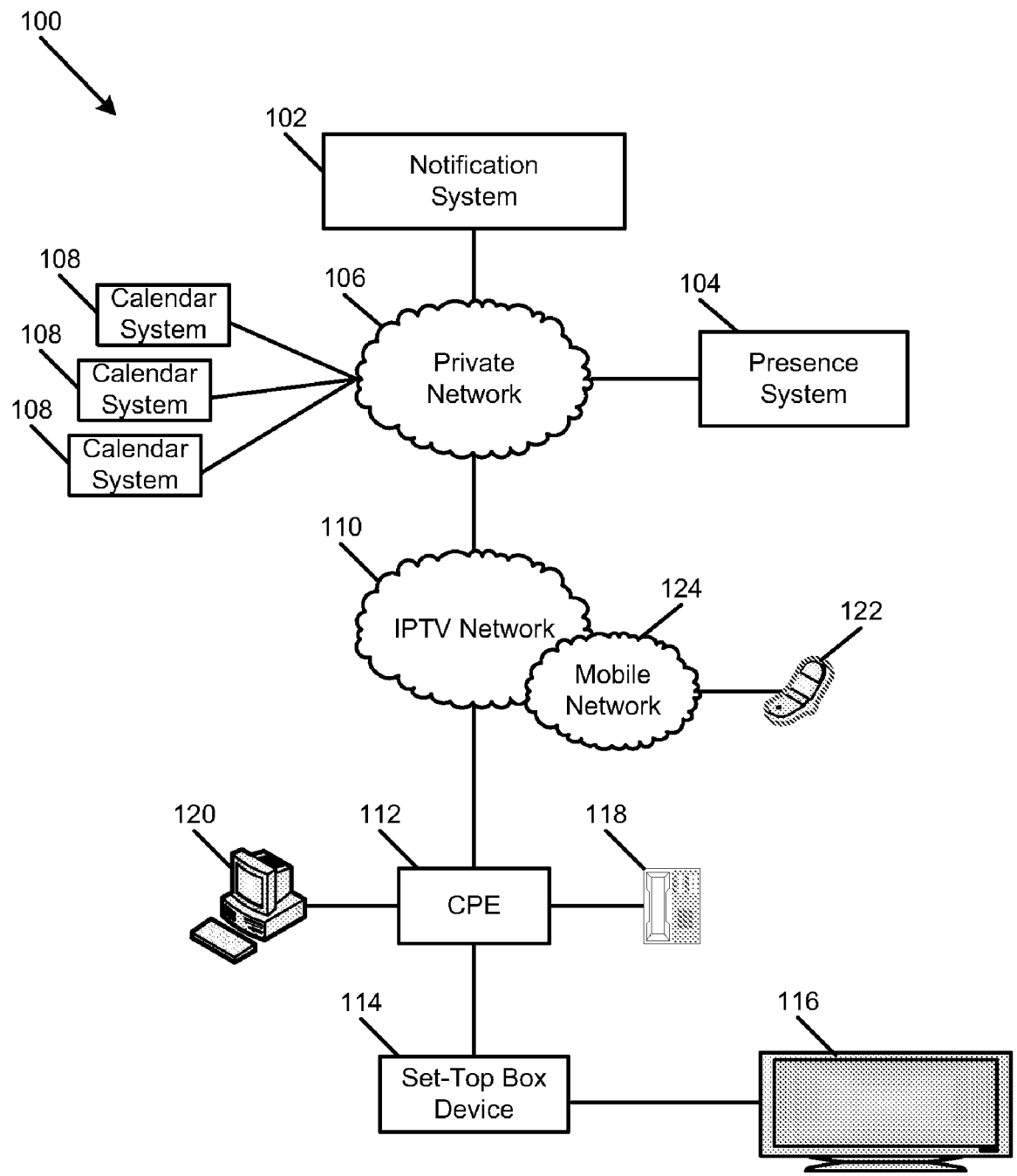
FIG. 1 is a block diagram illustrating a particular embodiment of a system to deliver event notifications.

FIG. 1 illustrates a particular embodiment of a system 100 to deliver event notifications. The system 100 includes a notification system 102 that is adapted to communicate with a presence system 104 via a private network 106, such as a private Internet Protocol (IP) network. In an illustrative embodiment, the notification system 102 and the presence system 104 can each include one or more servers. The notification system 102 is also adapted to communicate with one or more network-based calendar systems 108 via the private network 106. Each network-based calendar system 108 can include one or more servers adapted to store data related to calendar-based events associated with a subscriber. The network-based calendar system(s) 108 can include, for example, a network-based appointment calendar system, a network-based television program reminder system, a network-based bill pay reminder system, a network-based deadline reminder system, other network-based calendar systems, or any combination thereof.

Each network-based calendar system 108 is adapted to receive and store data indicating dates, times, or combinations thereof, related to calendar-based events associated with various subscribers to an event notification service, Internet Protocol Television (IPTV) service, one or more other services, or any combination thereof. In addition, each network-based calendar system 108 is adapted to determine that a subscriber is to be notified of a calendar-based event. The calendar-based event can be associated with the subscriber, or with another party who has designated the subscriber to receive a notification of the calendar-based event. In one embodiment, the network-based calendar system 108 can be adapted to send data to the notification system 102 indicating that a notification related to a calendar-based event is to be sent a certain amount of time before the calendar-based event, such as a number of days, minutes or hours before the calendar-based event. The amount of time can be pre-defined or can be specified by the subscriber or other party associated with the calendar-based event.

In a particular embodiment, the notification system 102 is adapted to communicate with a plurality of subscriber devices 114-122 via one or more networks, such as an IPTV access network 110, a mobile network 124, one or more other networks, or any combination thereof. The plurality of subscriber devices can include, for example, a set-top box device 114; a display device 116 coupled to the set-top box device 114; a Voice-over Internet Protocol (VoIP) phone 118; a computing device 120, such as a personal computer or laptop; a mobile device, such as a cellular phone 122, a pager or a personal data assistant (PDA); one or more other subscriber devices; or any combination thereof. In one embodiment, one or more of the subscriber devices 114-122 can be adapted to communicate with the IPTV access network 110 via a customer premises equipment (CPE) device 112, such as a residential gateway or other CPE device.

In a particular embodiment, the notification system 102 is adapted to receive data from a network-based calendar system 108 indicating that a subscriber is to be notified of a calendar-based event. In one embodiment, the data can indicate that a notification is to be sent to a party other than the subscriber associated with the calendar-based event. Examples of calendar-based events include an appointment occurring on a particular calendar date, a television program showing on a particular calendar date, a bill payment that is due on a particular calendar date, a tax filing deadline that occurs on a particular date, another calendar-based event, or any combination thereof. The notification system 102 is adapted to send, in response to the data received from the network-based calendar system 108, a request to the presence system 104 for presence information indicating whether is subscriber is present at one or more of the plurality of subscriber devices 114-122.

The presence system 104 is adapted to receive the request for subscriber presence information from the notification system 102. The presence system 104 is adapted to identify the plurality of devices 114-122 associated with the subscriber and to send data to the notification system 102 indicating whether the subscriber is present at one or more of the plurality of devices 114-122. The presence system 104 can be adapted to determine subscriber presence at one or more of the plurality of devices 114-122 on a periodic basis, in response to the request for subscriber presence information, or a combination thereof.

For example, the presence system 104 can be adapted to query the set-top box device 114 to determine whether the set-top box device 114 is powered on, whether the subscriber is logged in at the set-top box device 114, whether a profile associated with the subscriber is active at the set-top box device 114, whether there are one or more other indications of user presence at the set-top box device 114, or any combination thereof. In another example, the presence system 114 can be adapted to determine whether the subscriber is on a call at the VoIP phone 118, whether there are one or more indicators of subscriber presence at the VoIP phone 118, or a combination thereof.

In a further example, the presence system 104 can be adapted to determine whether the subscriber is logged in at the computing device 120, whether the subscriber is logged in to an instant messaging (IM) service via the computing device 120, whether the subscriber is logged in to an e-mail account via the computing device 120, whether there are one or more indications that the subscriber is present at the computing device 120, or any combination thereof. In still another example, the presence system 104 can be adapted to determine whether the cellular phone 122 or another mobile device is powered on, whether there are one or more other indicators of subscriber presence at the cellular phone 122 or another mobile device, or a combination thereof.

The presence system 104 is adapted to send data to the notification system 102 indicating whether the subscriber is present at any of the subscriber devices 114-122. For instance, the presence system 104 is adapted to send data to the notification system 102 indicating that the subscriber is present at the set-top box device 114, if the presence system 104 determines that the subscriber is present at the set-top box device 114. In addition, the presence system 104 is adapted to send data to the notification system 102 indicating that the subscriber is present at another subscriber device, if the presence system 104 determines that the subscriber is present at the other subscriber device (instead of or in addition to the set-top box device 114). In an illustrative embodiment, the data sent by the presence system 104 indicating subscriber presence can include an Internet protocol address, a mobile device contact number, an e-mail address, an IM service account identifier, other contact information to be used to send an event notification to the subscriber device at which the subscriber is present, or any combination thereof.

In a particular embodiment, the presence system 104 can be adapted to send data to the notification system 102 indicating one or more event notification preferences associated with the subscriber, when the presence system 104 determines that the subscriber is not present at any of the subscriber devices 114-122. The notification preference data can indicate that an event notification is to be sent to at least one preferred subscriber device, to an initiating device (i.e., a device from which a calendar-based event is set at the network-based calendar system 108), or a combination thereof, when subscriber presence is not detected at any of the subscriber devices.

In one embodiment, the notification preference data can indicate that an event notification corresponding to a particular type of calendar-based event is to be sent to a first preferred subscriber device, and that an event notification corresponding to another particular type of calendar-based event is to be sent to another preferred subscriber device. For example, the preference data can indicate that an appointment reminder is to be sent to the cellular phone 122 when subscriber presence is not detected at any of the subscriber devices 114-122, and that a television program reminder is to be sent to the computing device 120 via an e-mail account when subscriber presence is not detected at any of the subscriber devices 114-122. In another embodiment, the presence system 104 can be adapted to identify the at least one preferred subscriber device and to send data indicating the at least one preferred subscriber device. In a further embodiment, the notification system 102 can be adapted to query the network-based calendar system 108 for an initiating device when the notification system 102 receives data from the presence system 104 indicating that the subscriber is not present at any of the subscriber devices 114-122.

The notification system 102 is adapted to receive data from the presence system 104 indicating whether the subscriber is present at one or more of the plurality of subscriber devices 114-122. The notification system 102 is adapted to determine whether the subscriber is present at a set-top box device 114 and to send an event notification related to the calendar-based event to the set-top box device 114 when the notification system 102 receives data indicating that the subscriber is present at the set-top box device 114. The notification system 102 is adapted to send an event notification related to the calendar-based event to another subscriber device, when the notification system 102 receives data indicating that the subscriber is present at the other subscriber device. In a particular embodiment, the notification system 102 is adapted to send an event notification related to the calendar-based event to at least one preferred subscriber device, when the notification system 102 receives preference information, an indication that the subscriber is not present at any of the subscriber devices 114-122, an indication of the at least one preferred subscriber device, or any combination thereof.

In an alternative embodiment, a subscriber can specify a plurality of devices associated with a calendar-based event. The network-based calendar system 108 can be adapted to send data identifying the specified devices with data indicating that a subscriber is to be notified of the calendar-based event. The notification system 102 can be adapted to send data to the presence system 104 identifying the specified devices with a request for presence information, and the presence system 104 can be adapted to determine whether the subscriber is present at any of the specified devices (rather than all devices associated with the subscriber) for the calendar-based event.

Figure 2:
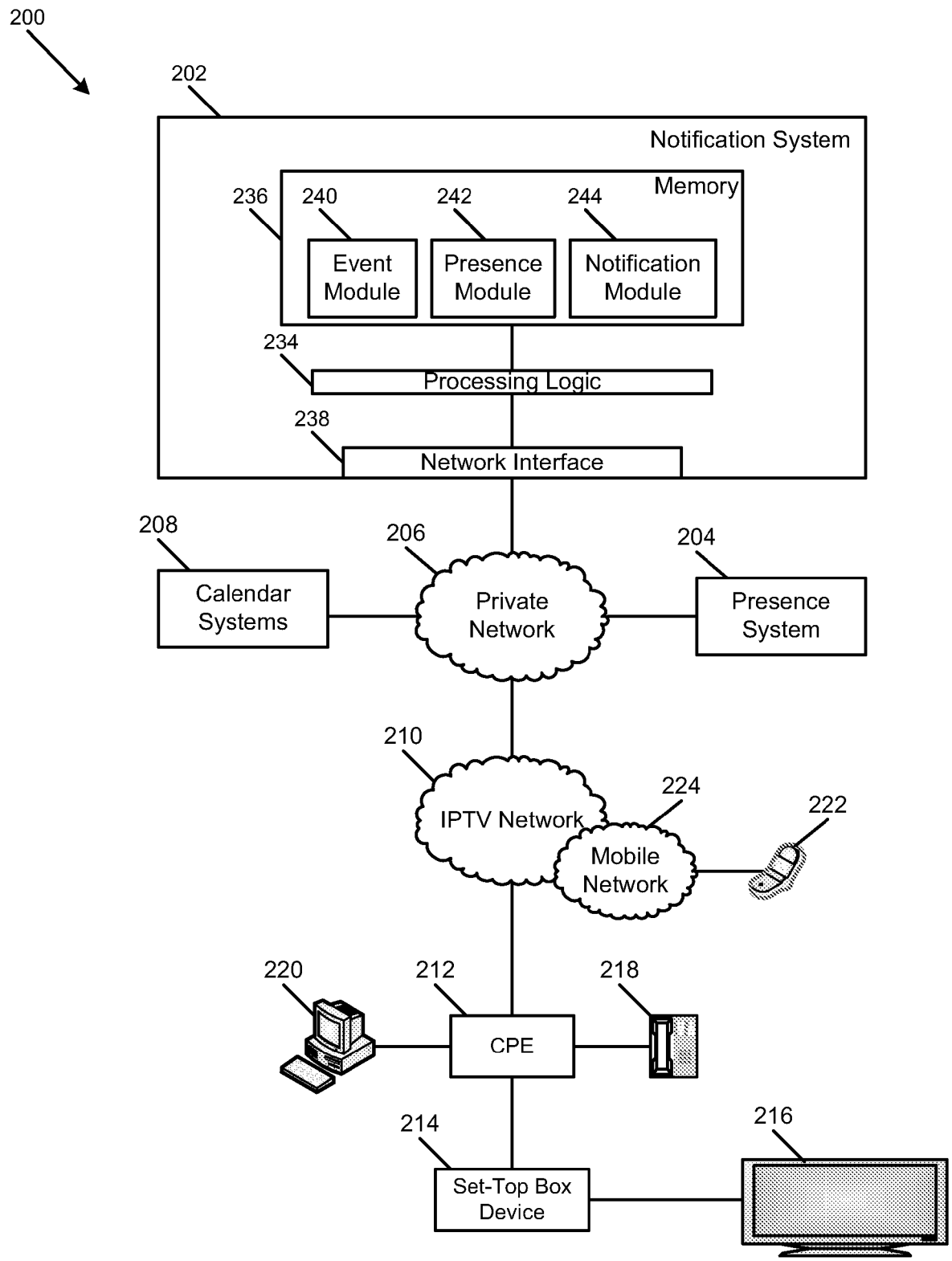
FIG. 2 is a block diagram illustrating a second particular embodiment of a system to deliver event notifications.

FIG. 2 illustrates a second particular embodiment of a system 200 to deliver event notifications. The system 200 includes a notification system 202 that is adapted to communicate with a presence system 204 via a private network 206, such as a private Internet Protocol (IP) network. The notification system 202 is also adapted to communicate with one or more network-based calendar systems 208 via the private network 206. In addition, the notification system 202 is adapted to communicate with a plurality of subscriber devices 214-222 via one or more networks.

In an illustrative embodiment, the notification system 206 can be adapted to communicate with an IPTV access network 210 via the private network 206, and the plurality of subscriber devices 214-222 can be adapted to communicate with the IPTV access network 210. For example, the set-top box device 214, the VoIP phone 218, the computing device 220, one or more other subscriber devices, or any combination thereof, can be adapted to communicate with the IPTV access network via CPE 212. In another example, one or more mobile subscriber devices, such as the mobile phone 222 can be adapted to communicate with the IPTV access network 210 via the mobile network 224.

In a particular embodiment, the notification system 202 includes processing logic 234 and memory 236 accessible to the processing logic 234. In addition, the notification system 202 can include a network interface 238 adapted to facilitate communication between the notification system 202 and the private network 206, the IPTV access network 210, one or more other networks, or any combination thereof. The memory 236 includes a plurality of modules 240-244. The modules 240-244 can include computer instructions that are readable and executable by the processing logic 234 to implement various functions of the notification system 202 with respect to delivering event notifications. For example, the modules 240-244 can represent various aspects of one or more software applications, operating systems, or other computer programs. In other embodiments, the modules 240-244 can be implemented as hardware logic or a combination of hardware logic and computer instructions.

In a particular embodiment, the memory 236 includes an event module 240 that is executable by the processing logic 234 to receive data from a network-based calendar system 208 indicating that the subscriber associated with the plurality of subscriber devices 214-222 is to be notified of a calendar-based event. In one embodiment, the subscriber can be associated with the calendar-based event. In another embodiment, another party can be associated with the calendar-based event, and data stored at the network-based calendar system 208 can indicate that the subscriber is to be notified of the calendar-based event.

The memory 236 also includes a presence module 242 that is executable by the processing logic 234 to send a request to the presence system 204 for presence information indicating whether the subscriber is present at one or more of the plurality of subscriber devices 214-222. The presence module 242 is also executable by the processing logic 234 to receive data from the presence module 242 indicating whether the subscriber is present at one or more of the plurality of subscriber devices 214-222. The memory 236 includes a notification module 244 that is executable by the processing logic 234 to send an event notification to one of the plurality of subscriber devices 214-222 based on the presence information received at the notification system 202 from the presence system 204. The notification module 244 can be executable by the processing logic 234 to generate the event notification. Alternatively, the notification system 202 can receive the event notification from the network-based calendar system 208.

For instance, the notification module 244 can be executable by the processing logic 234 to determine whether the subscriber is present at the set-top box device 214 and to send an event notification related to the calendar-based event to the set-top box device 214 when the notification system 202 receives data indicating that the subscriber is present at the set-top box device 214. In an illustrative embodiment, the event notification can be displayed at the display device 216. The notification module 244 can be executable by the processing logic 234 to send an event notification related to the calendar-based event to another subscriber device, when the notification system 202 receives data indicating that the subscriber is present at the other subscriber device.

In a particular embodiment, the presence module 242 is executable by the processing logic 234 to receive data from the presence system 204 indicating that an event notification is to be sent to one or more of the subscriber devices 214-222, based on subscriber preference data stored at the presence system 204. For example, when the presence system 204 determines that the subscriber is not present at any of subscriber devices 214-222, the presence system 204 can retrieve the preference data and send data to the notification system 202 indicating that an event notification is to be sent to the preferred subscriber device(s). In one embodiment, the presence module 242 is executable by the processing logic 234 to receive data from the presence system 204 indicating the subscriber preferences. In another embodiment, the presence module 242 is executable by the processing logic 234 to receive data indicating the preferred device(s) from the presence system 204. The notification module 244 can be executable by the processing logic 234 to send an event notification to the preferred subscriber device(s).

In an alternative embodiment, the network-based calendar system 208 can store data indicating an initiating device that was used to set the calendar-based event. The event module 240 can be executable by the processing logic 234 to receive data identifying the initiating device from the network-based calendar system 208. The notification module 244 can be executable by the processing logic 234 to send the notification to the initiating device when the subscriber is not present at any of subscriber devices 214-222.

Figure 3:
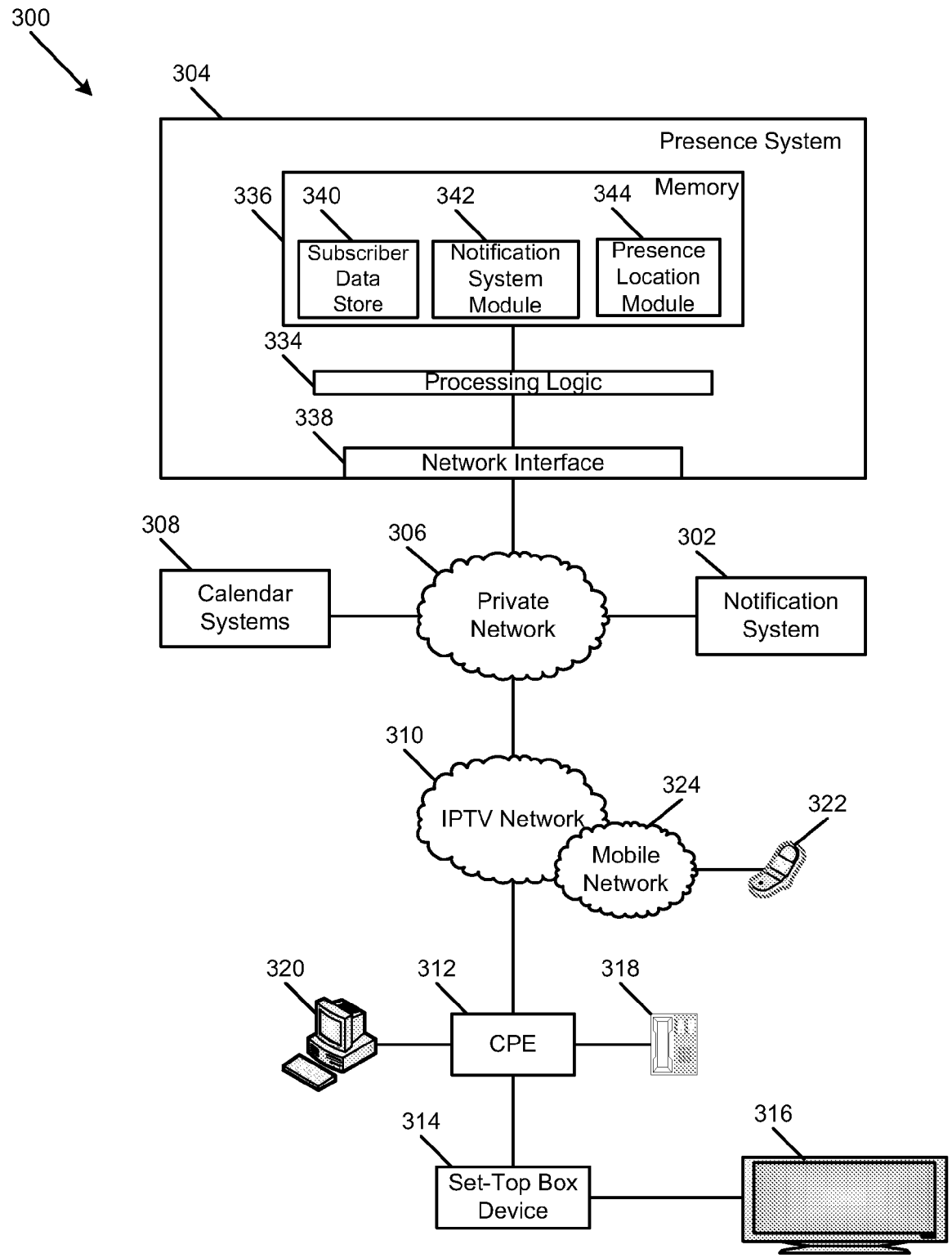
FIG. 3 is a block diagram illustrating a third particular embodiment of a system to deliver event notifications.

FIG. 3 illustrates a second particular embodiment of a system 300 to deliver event notifications. The system 300 includes a notification system 302 that is adapted to communicate with a presence system 304 via a private network 306, such as a private Internet Protocol (IP) network. The notification system 302 is also adapted to communicate with one or more network-based calendar systems 308 via the private network 306. In addition, the notification system 302 is adapted to communicate with a plurality of subscriber devices 314-322 via one or more networks.

In an illustrative embodiment, the notification system 306 can be adapted to communicate with an IPTV access network 310 via the private network 306, and the plurality of subscriber devices 314-322 can be adapted to communicate with the IPTV access network 310. For example, the set-top box device 314, the VoIP phone 318, the computing device 320, one or more other subscriber devices, or any combination thereof, can be adapted to communicate with the IPTV access network via CPE 312. In another example, one or more mobile subscriber devices, such as the mobile phone 322 can be adapted to communicate with the IPTV access network 310 via the mobile network 324.

In a particular embodiment, the presence system 304 includes processing logic 334 and memory 336 accessible to the processing logic 334. In addition, the presence system 304 can include a network interface 338 adapted to facilitate communication between the presence system 304 and the private network 306, the IPTV access network 310, one or more other networks, or any combination thereof. The memory 336 includes a plurality of modules 340-344. The modules 340-344 can include computer instructions that are readable and executable by the processing logic 334 to implement various functions of the presence system 304 with respect to delivering event notifications. For example, the modules 340-344 can represent various aspects of one or more software applications, operating systems, or other computer programs. In other embodiments, the modules 340-344 can be implemented as hardware logic or a combination of hardware logic and computer instructions.

The memory 336 includes a subscriber data store 340 to store data indicating identifications, contact information, other data, or any combination thereof, related to subscriber devices associated with each of a plurality of subscribers. In addition, the subscriber data store 340 can store preference data associated with each subscriber. The preference data can indicate, for example, one or more subscriber devices to which an event notification is to be sent when the subscriber is not present at any of the devices associated with the subscriber. In one embodiment, the notification preference data can indicate that an event notification corresponding to a particular type of calendar-based event is to be sent to a preferred subscriber device, and that an event notification corresponding to another particular type of calendar-based event is to be sent to another preferred subscriber device. For example, the preference data can indicate that an appointment reminder is to be sent to the cellular phone 322 when the subscriber is not present at any of the subscriber devices, and that a television program reminder is to be sent to the computing device 320 via an e-mail account when the subscriber is not present at any of the subscriber devices. The presence system 304 can be adapted to receive device data, preference data, or a combination thereof, from a subscriber via one or more of the subscriber devices 314-322.

The memory 336 also includes a notification system module 342 that is executable by the processing logic 334 to receive a request for subscriber presence information from the notification system 302. The memory 336 includes a presence location module 344 that is executable by the processing logic 334 to identify a plurality of devices associated with the subscriber, such as the plurality of devices 314-322, based on data stored at the subscriber data store 340. In addition, the presence location module 344 is executable by the processing logic 334 to determine whether the subscriber is present at one or more of the plurality of devices 314-322. The presence location module 344 can be executable by the processing logic 334 to determine subscriber presence on a periodic basis, in response to the request for subscriber presence information, or a combination thereof.

For example, the presence location module 344 can be executable by the processing logic 334 to query the set-top box device 314 to determine whether the set-top box device 314 is powered on, whether the subscriber is logged in at the set-top box device 314, whether a profile associated with the subscriber is active at the set-top box device 314, whether there are one or more other indications of user presence at the set-top box device 314, or a combination thereof. In another example, the presence location module 344 can be executable by the processing logic 334 to determine whether the subscriber is on a call at the VoIP phone 318, whether there are one or more indicators of subscriber presence at the VoIP phone, or a combination thereof.

In a further example, the presence location module 344 can be executable by the processing logic 334 to determine whether the subscriber is logged in at the computing device 320, whether the subscriber is logged in to an IM service via the computing device 320, whether the subscriber is logged in to an e-mail account via the computing device 320, whether there are one or more indications that the subscriber is present at the computing device 320, or any combination thereof. In still another example, the presence location module 344 can be executable by the processing logic 334 to determine whether the cellular phone 322 or another mobile device is powered on, whether there are one or more other indicators of subscriber presence at the cellular phone 322 or another mobile device, or a combination thereof.

The notification system module 342 can be executable by the processing logic 334 to send data to the notification system 302 indicating whether the subscriber is present at any of the subscriber devices 314-322. For instance, the notification system module 342 can be executable by the processing logic 334 to send data to the notification system 302 indicating that the subscriber is present at the set-top box device 314, if the presence system 304 determines that the subscriber is present at the set-top box device 314. In addition, the notification system module 342 can be executable by the processing logic 334 to send data to the notification system 302 indicating that the subscriber is present at another subscriber device, if the presence system 304 determines that the subscriber is present at the other subscriber device. In an illustrative embodiment, the data sent by the presence system 304 indicating subscriber presence can include an Internet protocol address, phone number, an e-mail account, an IM service account, or other contact information to be used to send an event notification to the subscriber device at which the subscriber is present.

In a particular embodiment, the notification system module 342 can be executable by the processing logic 334 to send data to the notification system 302 indicating one or more event notification preferences associated with the subscriber, one or more preferred subscriber devices, or a combination thereof, when the presence system 304 determines that the subscriber is not present at any of the subscriber devices 314-322.

In an alternative embodiment, the notification system module 342 can be executable by the processing logic 334 to receive data from the notification system 302 indicating a plurality of specified devices associated with a particular calendar-based event. The presence location module 344 can be executable by the processing logic 334 to determine whether the subscriber is present at any of a plurality of specified devices (rather than all devices associated with the subscriber) associated with the calendar-based event. The notification system module 342 can be executable by the processing logic 334 to send data to the notification system 302 indicating whether the subscriber is present at one or more of the specified devices.

Figure 4:
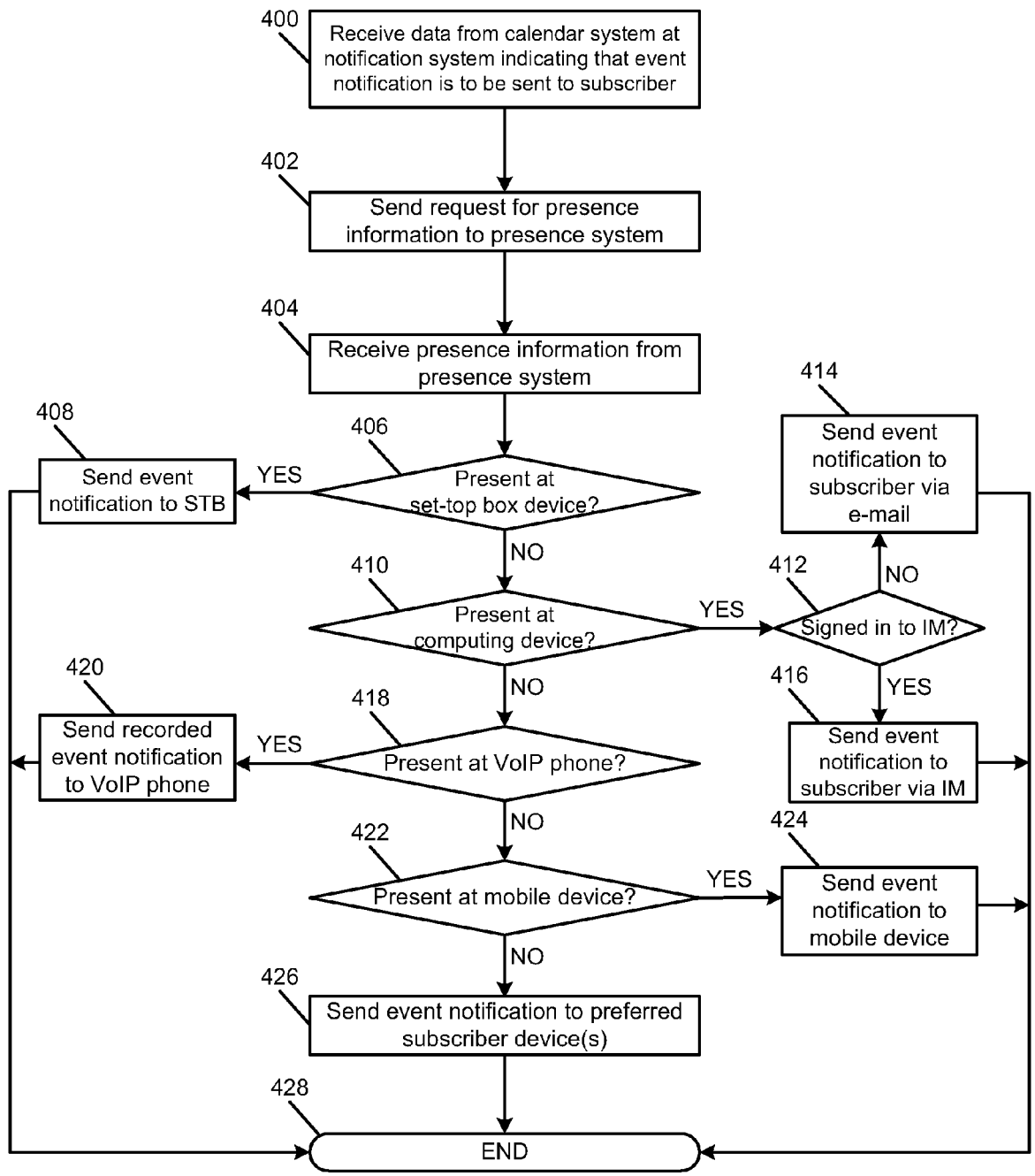
FIG. 4 is a block diagram illustrating a particular embodiment of a method of delivering event notifications.

FIG. 4 illustrates a particular embodiment of a method of delivering event notifications. At block 400, a notification system receives data from a network-based calendar system indicating that a subscriber is to be notified of a calendar-based event. Moving to block 402, the notification system sends a request to a presence system for presence information related to the subscriber. Proceeding to block 404, the notification system receives presence information from the presence system. The presence information can include data indicating a subscriber device at which the subscriber is present, preference data indicating that an event notification is to be sent to at least one preferred subscriber device when the subscriber is not present at any subscriber device, data indicating the at least one preferred subscriber device, subscriber device contact information, other data, or any combination thereof.

Continuing to decision node 406, the notification system determines whether the presence information indicates that the subscriber is present at a set-top box device associated with the subscriber. If the presence information indicates that the subscriber is present at the set-top box device, the method advances to block 408, and the notification system sends an event notification related to the calendar-based event to the set-top box device via a network, such as an IPTV network.

Returning to decision node 406, if the presence information indicates that the subscriber is not present at the set-top box device, the method advances to decision node 410, and the notification system determines whether the presence information indicates that the subscriber is present at a computing device associated with the subscriber. In an illustrative embodiment, if the presence information indicates that the subscriber is present at the computing device, the method moves to decision node 412, and the notification system can determine whether the presence information indicates that the subscriber is logged in to an IM service.

If the presence information indicates that the subscriber is not logged into the IM service, the method can proceed to block 414, and the notification system sends an event notification related to the calendar-based event to the subscriber computing device via an e-mail account associated with the subscriber. Whereas, if the presence information indicates that the subscriber is logged in to the IM service, the method moves to block 416, and the notification system sends an event notification related to the calendar-based event to the subscriber computing device via the IM service.

Returning to decision node 410, if the presence information indicates that the subscriber is not present at the computing device, the method proceeds to decision node 418, and the notification system determines whether the subscriber is present at a VoIP phone associated with the subscriber. If the presence information indicates that the subscriber is present at the VoIP phone, the method moves to block 420, and the notification system sends a recorded event notification or other event notification related to the calendar-based event to the VoIP phone via the network.

Returning to decision node 418, if the presence information indicates that the subscriber is not present at the VoIP phone, the method proceeds to decision node 422, and the notification system determines whether the presence information indicates that the subscriber is present at a mobile device associated with the subscriber, such as a cellular phone, a personal data assistant, a pager, or other mobile device. If the presence information indicates that the subscriber is present at the mobile device, the method moves to block 424, and the notification system sends an event notification related to the calendar-based event to the mobile device. If the presence information indicates that the subscriber is not present at the mobile device, the method advances to block 426, and the notification system can send an event notification to one or more preferred subscriber devices. The method terminates at 428.

Figure 5:
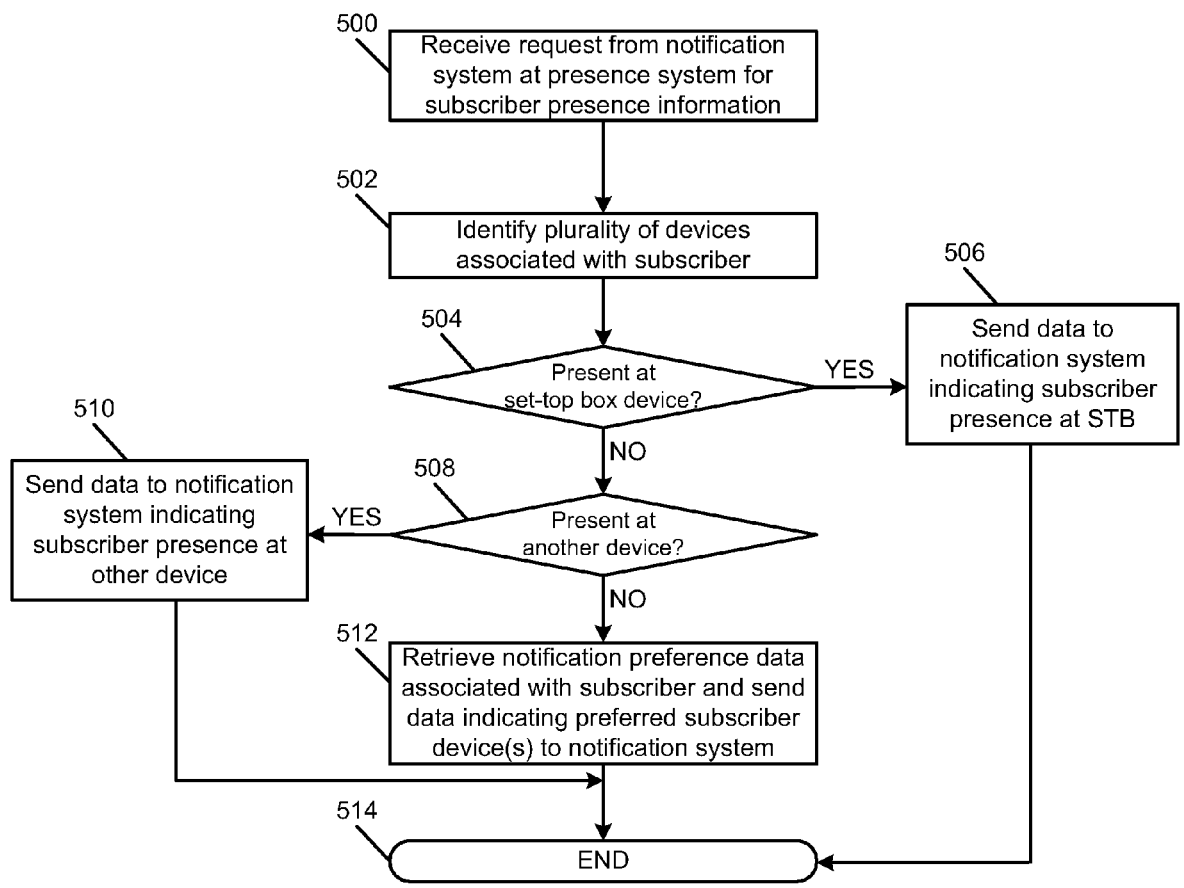
FIG. 5 is a block diagram illustrating a second particular embodiment of a method of delivering event notifications.

FIG. 5 illustrates a second particular embodiment of a method of delivering event notifications. At block 500, a presence system receives a request for subscriber presence information from a notification system. Moving to block 502, the presence system identifies a plurality of devices associated with the subscriber. Proceeding to decision node 504, the presence system determines whether the subscriber is present at a set-top box device associated with the subscriber. For example, the presence system can communicate with the set-top box device to determine whether the set-top box device is activated, whether the subscriber is logged in at the set-top box device, whether a profile associated with the subscriber is active at the set-top box device, whether there are other indications of subscriber presence at the set-top box device, or any combination thereof.

If the presence system determines that the subscriber is present at the set-top box device, the method continues to block 506, and the presence system sends data to the notification system indicating that the subscriber is present at the set-top box device. On the other hand, if the presence system determines that the subscriber is not present at the set-top box device, the method moves to decision node 508, and the presence system determines whether the subscriber is present at another device associated with the subscriber. If the presence system determines that the subscriber is present at another device, the method proceeds to block 510, and the presence system sends data to the notification system indicating that the subscriber is present at the other device.

Returning to decision node 508, if the presence system determines that the subscriber is not present at another device associated with the subscriber, the method continues to block 512. At block 512, in a particular embodiment, the presence system can retrieve notification preference data associated with the subscriber. The notification preference data indicates that event notifications are to be sent to one or more preferred subscriber devices, when a subscriber presence is not detected at any of the subscriber devices. The presence system sends data to the notification system indicating the preferred subscriber device(s). The method terminates at 514.

Figure 6:
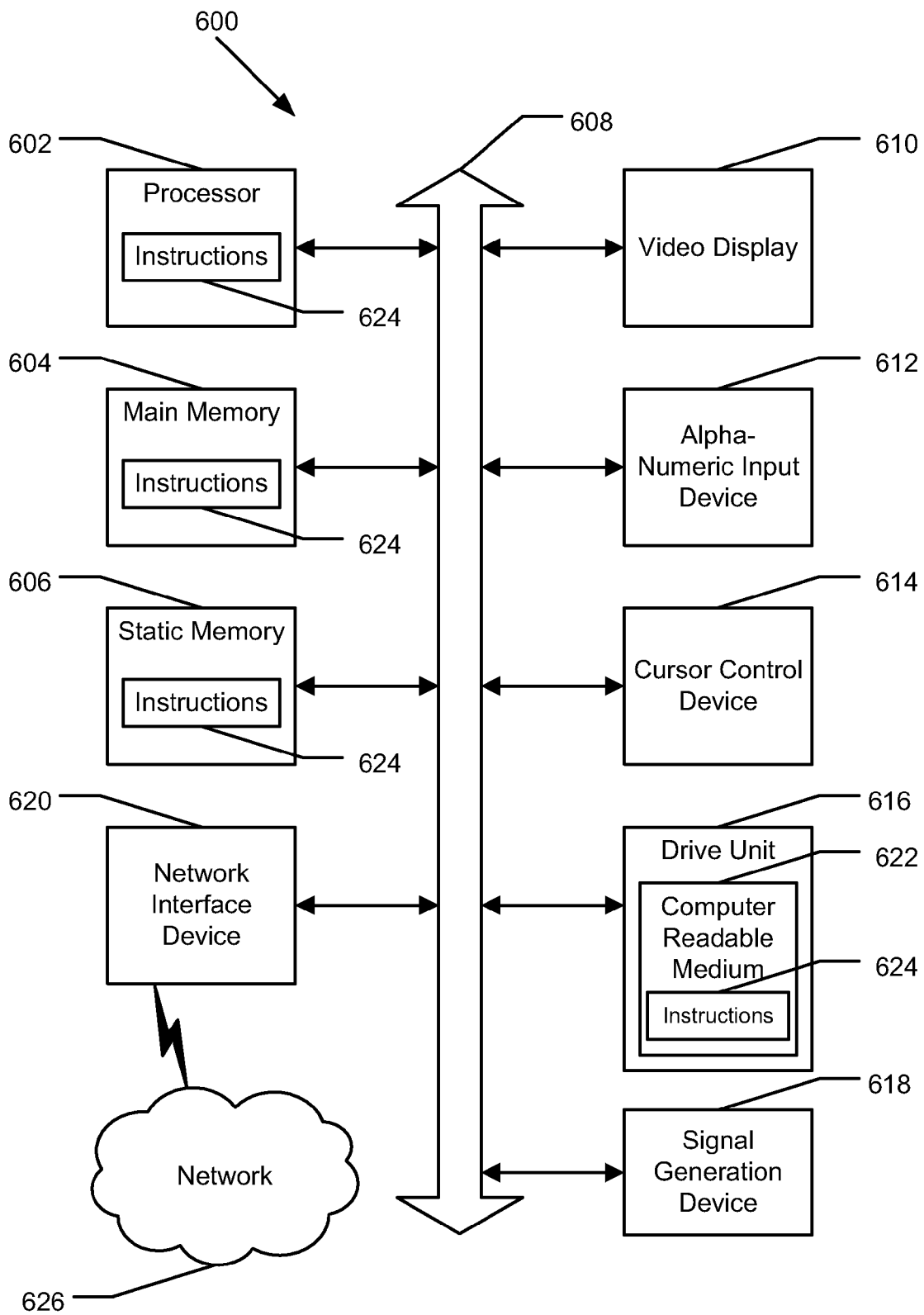
FIG. 6 is a block diagram illustrating a particular embodiment of a general computer system.

FIG. 6 shows an illustrative embodiment of a general computer 600 including a set of instructions that can be executed to cause the computer system to perform any one or more of the methods or computer based functions disclosed herein. The computer system 600 may operate as a standalone device or may be connected, e.g., using a network, to other computer systems or peripheral devices. In an illustrative embodiment, such standalone and peripheral devices can include, for example, set-top box devices, notification systems, presence systems, network-based calendar systems, other network elements, other subscriber devices, or any combination thereof, as shown in FIGS. 1-3.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method of providing event notifications, the method comprising:

receiving data from a network-based calendar system at a notification system, the data indicating that a subscriber is to be notified of a calendar-based event;

receiving presence information related to the subscriber from a presence system, the presence information indicating whether the subscriber is present at one or more of a plurality of subscriber devices, wherein the plurality of subscriber devices includes a set-top box device, wherein the presence information indicates subscriber preferences, wherein the subscriber preferences indicate that the event notification is to be sent to an initiating device when the subscriber is not present at any of the plurality of subscriber devices, wherein the initiating device is a device from which the calendar-based event is set at the network-based calendar system; and sending an event notification related to the calendar-based event only to the set-top box device without providing an email message of the event notification to any of the plurality of subscriber devices, when the presence information indicates that the subscriber is present at the set-top box device, sending the event notification to a first preferred subscriber device when the vent notification corresponds to a particular first type of calendar-based event, sending the event notification to a second preferred subscriber device when the event notification corresponds to a particular second type of calendar-based event, and sending the notification related to the calendar-based event in a recorded voice over internet protocol message to only the initiating device without providing an email message of the event notification to any of the plurality of subscriber devices, when the presence information indicates that the subscriber is not present at any of the plurality of subscriber devices.

2. The method of claim 1, further comprising sending the event notification to another of the plurality of subscriber devices, when the presence information indicates that the subscriber is present at the other of the plurality of subscriber devices.

3. The method of claim 1, further comprising sending the event notification to the at least one preferred subscriber device when the presence information indicates that the event notification is to be sent to the at least one preferred subscriber device.

4. The method of claim 1, wherein the calendar-based event is associated with a party other than the subscriber.

5. The method of claim 1, further comprising generating the event notification at the notification system.

6. The method of claim 1, further comprising receiving the event notification at the notification system from the calendar system.

7. A method of delivering event notifications, the method comprising:
   receiving a request for presence information related to a subscriber from a notification system at a presence system;
   storing presence data in a memory of the presence system, wherein the presence data indicates a plurality of devices associated with the subscriber;
   identifying the plurality of devices associated with the subscriber, wherein the plurality of devices includes a set-top box device and a cellular telephone;
   determining whether the subscriber is present at one or more of the plurality of devices;
   sending the presence information to the notification system,
   wherein the presence information indicates that the subscriber is present at the set-top box device and the cellular telephone, when the presence system determines that the subscriber is present at the set-top box device and the cellular telephone, and wherein an event notification related to a calendar-based event is to be sent only to the subscriber at only the set-top box device and the cellular telephone by the notification system based on the presence information in a format other than by e-mail;
   sending the event notification to a first preferred subscriber device when the event notification corresponds to a particular first type of calendar-based event;
   sending the event notification to a second preferred subscriber device when the event notification corresponds to a particular second type of calendar-based event;
   sending the event notification to only an initiating device of the calendar-based event when the presence information indicates that the subscriber is not present at the plurality of subscriber devices, wherein the initiating device is a device from which the calendar-based event is set at the network-based calendar system.

8. The method of claim 7, wherein the event notification is to be sent to the cellular telephone of the subscriber by the notification system in the format of a recorded message.

9. The method of claim 7, wherein the presence information indicates that the subscriber is present at another of the plurality of devices, when the presence system determines that the subscriber is present at the other of the plurality of devices.

10. A system to provide event notifications, the system comprising:
   a notification system including processing logic and memory accessible to the processing logic, wherein the memory includes instructions executable by the processing logic to:
   receive data from a network-based calendar system, the data indicating that a subscriber is to be notified of a calendar-based event;
   request and receive presence information related to the subscriber from a presence system in response to the data received from the network based calendar system, the presence information indicating whether the subscriber is present at one or more of a plurality of subscriber devices, wherein the plurality of subscriber devices includes a set-top box device;
   send an event notification related to the calendar-based event to only the set-top box device without providing an email message of the event notification to any of the plurality of subscriber devices when the presence information indicates that the subscriber is present at the set-top box device;
   send the event notification to a first preferred subscriber device when the event notification corresponds to a particular first type of calendar-based event;
   send the event notification to a second preferred subscriber device when the event notification corresponds to a particular second type of calendar-based event; and
   send the event notification to only an initiating device of the calendar-based event when the presence information indicates that the subscriber is not present at the plurality of subscriber devices, wherein the initiating device is a device from which the calendar-based event is set at the network-based calendar system.

11. The system of claim 10, wherein the plurality of devices includes a computing device, a Voice-over Internet Protocol phone, a mobile device, or any combination thereof.

12. The system of claim 10, wherein the notification system is adapted to receive the data from the network-based calendar system via a private network.

13. The system of claim 10, wherein the network-based calendar system comprises a network-based appointment calendar system, a network-based television program reminder system, a network-based bill pay reminder system, a network-based deadline reminder system, or any combination thereof.

14. The system of claim 10, wherein the calendar-based event includes an appointment, a television program showing, a bill payment due, a filing deadline, or any combination thereof.

15. A system to deliver event notifications, the system comprising:
   a presence system including processing logic and memory accessible to the processing logic, wherein the memory includes instructions executable by the processing logic to:
   receive a request for presence information related to a subscriber from a notification system;
   identify a plurality of devices associated with the subscriber, wherein the plurality of devices includes a set-top box device and a cellular telephone;

determine whether the subscriber is present at one or more of the plurality of devices; and send presence information to the notification system;

wherein the presence information indicates that the subscriber is present at the set-top box device and the cellular telephone, when the presence system determines that the subscriber is present at the set-top box device and at the cellular telephone, wherein an event notification related to a calendar-based event is to be sent only to the subscriber at only the set-top box device and the cellular telephone by the notification system based on the presence information in a format other than by e-mail;

send the event notification to a first preferred subscriber device when the event notification corresponds to a particular first type of calendar-based event;

send the event notification to a second preferred subscriber device when the event notification corresponds to a particular second type of calendar-based event; and send the event notification to only an initiating device of the calendar-based event when the presence information indicates that the subscriber is not present at the plurality of subscriber devices, wherein the initiating device is a device from which the calendar-based event is set at the network-based calendar system.

16. The system of claim 15, wherein the presence system is adapted to determine that the subscriber is present at the set-top box device, when the presence system determines that a profile associated with the subscriber is active at the set-top box device.

17. The system of claim 15, wherein the presence information includes contact information associated with a device at which the subscriber is present.

18. The system of claim 17, wherein the contact information includes an Internet protocol address, an e-mail address, an instant messaging account identifier, a mobile device contact number, or a combination thereof.

19. A non-transitory computer-readable medium having processor-readable instructions that are executable by a processor to perform a method, the method comprising:

receiving data from a network-based calendar system at a notification system, the data indicating that a subscriber is to be notified of a calendar-based event;

receiving presence information related to the subscriber from a presence system, the presence information indicating whether the subscriber is present at one or more of a plurality of subscriber devices, wherein the plurality of subscriber devices includes a set-top box device;

sending an event notification related to the calendar-based event to only the set-top box device without providing an email message of the event notification to any of the plurality of subscriber devices when the presence information indicates that the subscriber is present at the set-top box device;

sending the event notification to a first preferred subscriber device when the event notification corresponds to a particular first type of calendar-based event;

sending the event notification to a second preferred subscriber device when the event notification corresponds to a particular second type of calendar-based event; and sending the event notification to only an initiating device of the calendar-based event without providing an email message of the event notification to any of the plurality of subscriber devices when the presence information indicates that the subscriber is not present at the plurality of subscriber devices, wherein the initiating device is a device from which the calendar-based event is set at the network-based calendar system.

20. The non-transitory computer-readable medium of claim 19, wherein the method further comprises sending the event notification to an instant messaging account or to an e-mail account associated with the subscriber, when the presence information indicates that the subscriber is present at the computing device.

21. The non-transitory computer-readable medium of claim 19, wherein the event notification includes a recorded message, when the presence information indicates that the subscriber is present at a cellular phone or Voice-over Internet Protocol phone.

* * * * *